United States Patent [19]

Clark et al.

[11] Patent Number: 4,808,995

[45] Date of Patent: Feb. 28, 1989

[54] ACCESSORY-EXPANDABLE, RADIO-CONTROLLED, DOOR OPERATOR WITH MULTIPLE SECURITY LEVELS

[75] Inventors: John E. Clark, Ann Arbor; Dean C. Duhame, Roseville, both of Mich.

[73] Assignee: Stanley Automatic Openers, Detroit, Mich.

[21] Appl. No.: 858,651

[22] Filed: May 2, 1986

[51] Int. Cl.[4] .......................... H04Q 7/02; G06F 7/04

[52] U.S. Cl. .......................... 340/825.69; 340/825.31; 340/825.32; 318/16; 49/25; 49/31

[58] Field of Search ...................... 340/825.69, 825.71, 340/825.72, 825.31, 825.32; 318/16, 445, 581; 49/25, 31

[56] References Cited

U.S. PATENT DOCUMENTS

| | | | |
|---|---|---|---|
| 2,756,990 | 7/1956 | Reamey | 318/445 |
| 3,906,348 | 9/1975 | Willmott . | |
| 4,141,010 | 2/1979 | Umpleby et al. . | |
| 4,178,549 | 12/1979 | Ledenbach et al. | 340/825.69 |
| 4,357,564 | 11/1982 | Deming et al. | 318/16 |
| 4,360,801 | 11/1982 | Duhame . | |
| 4,365,250 | 12/1982 | Matsuoka et al. | 318/16 |
| 4,385,296 | 5/1983 | Tsubaki et al. | 340/825.69 |
| 4,433,274 | 2/1984 | Duhame . | |
| 4,464,651 | 8/1984 | Duhame . | |

OTHER PUBLICATIONS

*Printer Connections Bible,* Kim G. House et al., 1985, Howard W. Sams & Co., Inc.; pp. 159-161.

*Primary Examiner*—Benedict V. Safourek
*Assistant Examiner*—Ralph E. Smith
*Attorney, Agent, or Firm*—Krass & Young

[57] ABSTRACT

A radio remote-controlled door operator for use, among other uses, as a residential garage door operator. The transmitter contains two buttons, one to produce normal door operation and the other to set the operator into a "secure" mode wherein it will be non-responsive to further valid operating codes until reset. In addition, a second deeper level of security may be established by means of a vacation switch which disconnects the operator from the AC power supply. The operator system comprises a microprocessor which is programmed to perform various accessory functions even through the accessories may not be present. Various microprocessor inputs are tied to a false "safe" level so that even though the accessory programs are run, no outputs result and no interference with normal door operation is produced.

6 Claims, 6 Drawing Sheets

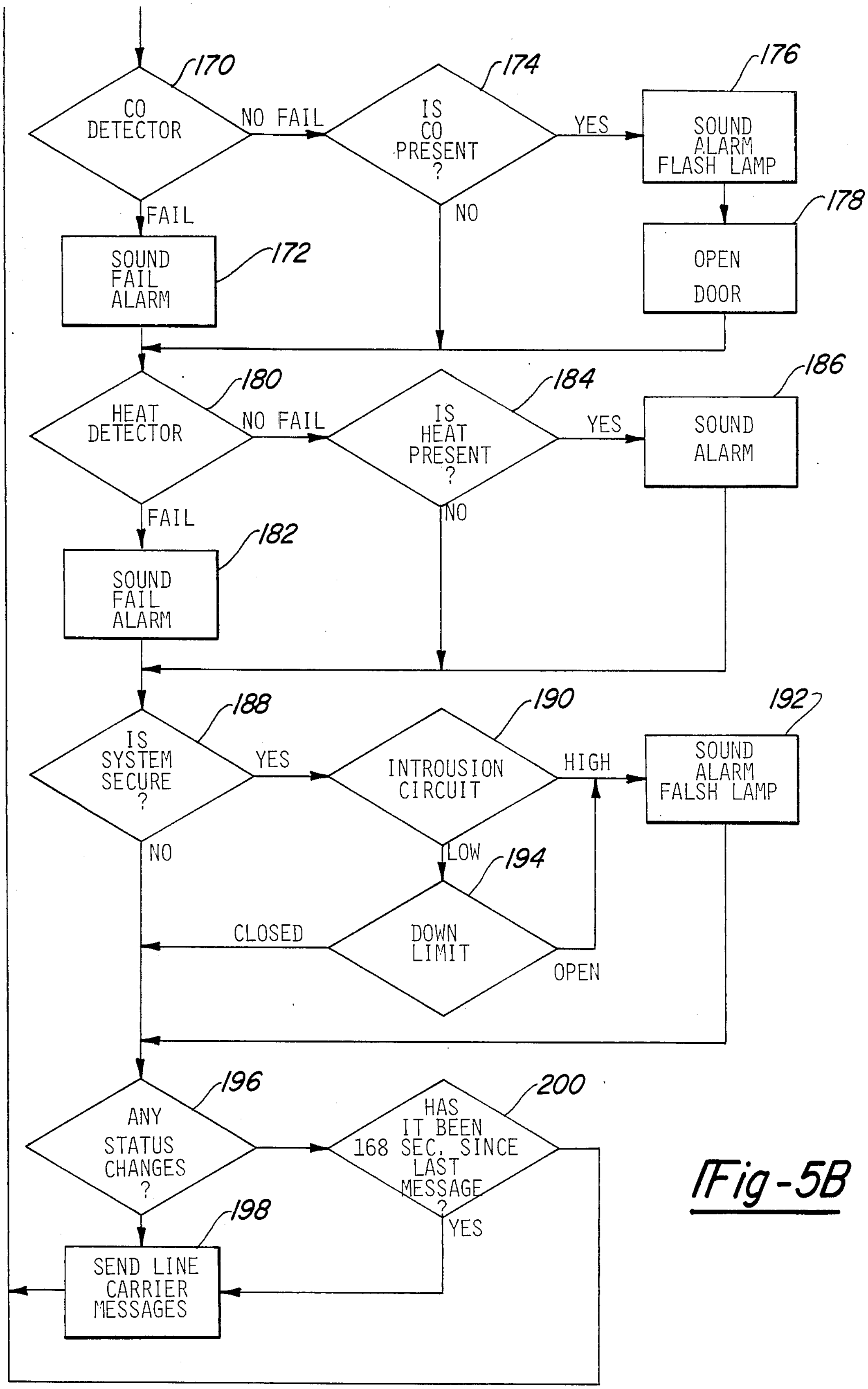
IFig-5B

ACCESSORY-EXPANDABLE, RADIO-CONTROLLED, DOOR OPERATOR WITH MULTIPLE SECURITY LEVELS

INTRODUCTION

This invention relates to radio-controlled door operators such as are commonly used for remote control of power garage doors and particularly to a radio-controlled door operator having means for providing at least two levels of operator disablement for security purposes, and to a radio-controlled door operator which is readily expandable to accommodate accessory devices such as toxic gas detectors and remote monitors.

BACKGROUND OF THE INVENTION

Radio remote controlled door operators have become increasingly more popular for use in residences, parking areas and other locations to which controlled access is deemed essential or desirable. The typical radio remote door operator comprises, in addition to the mechanical components of the door and door mounting system, a motor which is capable of driving the door between opened and closed positions, and a motor controller which is adapted to be connected to a power supply and which is operatively associated with the motor for controlling the movements of the door in response to various signals; for example, the controller determines whether the motor drives the door in the opening direction or in the closing direction. In addition, the controller may incorporate in whole or in part certain safety features such as automatic stop and reverse functions. In addition, the typical door operator system comprises a low power, limited range radio transmitter having a pushbutton which is actuable manually to produce a coded signal, and a radio receiver/decoder for triggering operation of the controller when the coded signal is received in the proper format.

A recent development in the evolution of door operators involves the introduction of digital rather than analog or frequency/amplitude codes thereby greatly expanding the number of available codes and the security which is available to the individual door operator owners; i.e., similar to automobile door locks, the greater the number of available codes, the less likely that a transmitter other than that which is owned and preset by the door operator owner will successfully initiate a door opening function. One digital radio tranmission/receiving/decoding system is disclosed in the U.S. Pat. No. to Umpleby et al 4,141,010, "Digital Encoder for Door Operator" issued Feb. 20, 1979; another digital system is disclosed in Wilmott, U.S. Pat. No. 3,906,348.

Despite the availability of a large number of operator codes in the digital system, many owners continue to feel uncomfortable when leaving a power garage door operator in a fully operative condition while they are away from home for long periods of time or when leaving their home or place of business unattended. It is common for many owners to physically pull the power plug on their door operators to achieve a higher level of security.

The residential garage door operator has over the years become a more and more complex device. It is now known at least through the patent literature to combine multiple function processors with the digital receiver/decoder and to incorporate into an operator system such accessory devices as gas detectors and remote monitors which operate in a line carrier signal transmission mode. However, such operators, when combined with the various accessory devices, become expensive to purchase and to install, particularly as an after-market device; i.e., to retrofit an existing home or replace an older operator. Therefore, it is desirable to provide an operator system which is capable of expansion to accommodate accessory devices both from the standpoint of initial sale price and for the purpose of opening up an after-market for add-on accessory devices.

SUMMARY OF THE INVENTION

According to a first aspect of the invention, a door operator system is provided which is capable of radio remote control as purchased and which is capable of being selectively disabled in multiple levels; that is, capable of being remotely rendered non-responsive to even a proper radio coded signal and which may be effectively disconnected from the power supply for deeper security purposes in a convenient fashion.

In general, this is accomplished by providing a "vacation switch" which may be selectively actuated by the owner to effectively disconnect the operator controller from its power supply and, as a lesser level of security, a device, preferably actuated through the radio remote transmitter, for disabling the operator so that it no longer responds to a proper radio transmitted code, but which can be reset for normal operation without the need to gain access to the secured area.

According to a second aspect of the invention, a radio remote operator system of the type employing a digital code and a multiple function digital processor in the receiver/decoder is made expandable so as to accommodate the after-market addition of accessory devices such as toxic gas sensors, portal security systems and remote status monitors.

In general this is accomplished by providing in the digital operator a processor having a memory storage facility which is programmed to review, in addition to the normal door opening and closing commands, a number of other input signals and to provide output function signals on a number of output terminals, the non-operative input terminals being commonly tied to a signal level, such as operator ground, which indicates a "safe" or "no function" status and in which the unused output terminal-s are simply left unconnected. Therefore, it is a relatively simple matter to connect in the various accessory devices including those which provide input signals to the operator processor and those which respond to the signals either by causing a particular function to occur or those which simply indicate a status.

In this specfication there are a number of terms which, within the context of the present disclosure, have broader meanings than might be ordinarily associated with those terms. Therefore, the following definitions shall be deemed to apply throughout this disclosure unless otherwise indicated:

the term "door" shall be construed to include not only a conventional garage door or pedestrian door but other similarly operable access control devices such as gates, traffic control arms, windows, and vault closures. other similarly operable access control device;

the term "operator" shall be construed to mean an electromechanical device including a motor which is appropriately mechanically connected to a "door" to produce powered operation of the door in both the opening and closing directions;

the terms "button" and "push button", as used herein shall be construed to mean any type of switch which is susceptible of manual operation; and the term "code" as used herein shall be construed to means a digital code consisting of a plurality of individual bits, the values of which may be preselected as either a "1" or a "0."

DETAILED DESCRIPTION OF THE ILLUSTRATIVE EMBODIMENT

Figure 1:
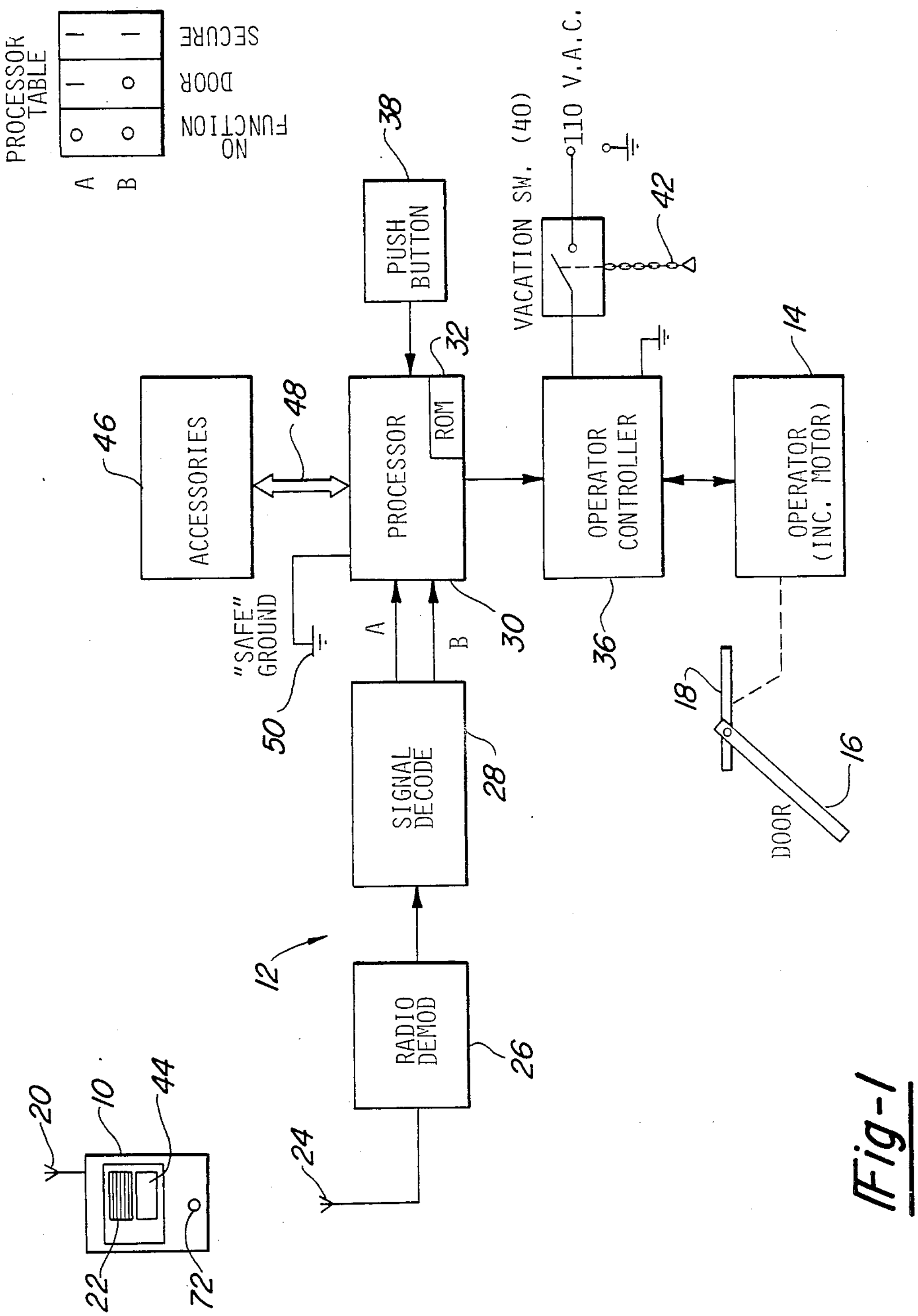
FIG. 1 is a schematic diagram of a door operator system incorporating both aspects of the present invention as previously described.

In FIG. 1, article 10 is a battery-powered hand-held transmitter adapted to send digital coded signals in two distinct formats to a receiver/decoder 12 for affecting the functional status of an operator 14 which is mechanically connected to a door 16 mounted on a track system 18 for movement between opened and closed positions. Although the structure with which door 16 is associated is not illustrated, it will be understood from the foregoing that it may be a variety of structures including, as typical application or installation, a residential garage.

Figure 4:
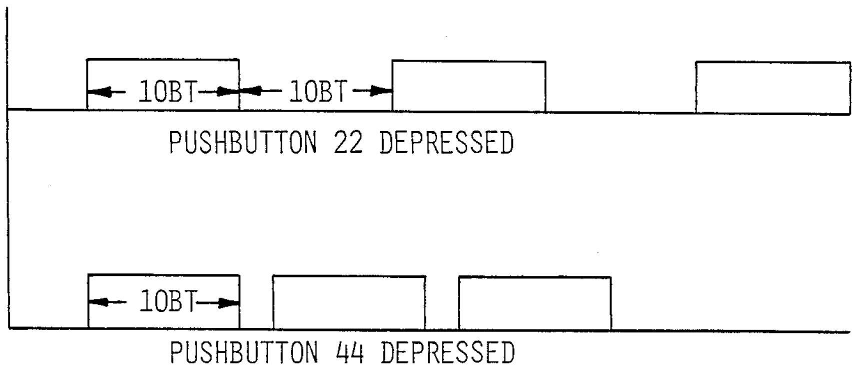
FIG. 4 a diagram of signal waveforms occurring in the devices of FIGS. 2 and 3.

Transmitter 10 is shown to comprise an antenna 20 which, although illustrated external to the housing of transmitter 10, is preferably a printed circuit antenna which is wholly within the housing of the device. The transmitter comprises a first pushbutton 22 which is manually operable to produce a pulse train consisting of ten digital pulses which may be selected by the system owner/operator in any combination of 1's and 0's. As shown in FIG. 4, the depression of button 22 creates a 10-bit pulse train followed by a blank time of a length which is approximately equal to the pulse train time. The pulse train and blank times repeat in alternate order as long as the button 22 is depressed. Note that the surface of button 22 is preferably provided with a distinctive tactile pattern such as ridges, dots or strips so that the operator may determine by feel that he is utilizing the button 22 for the purpose of initiating normal operation of the operator 14 and door 16.

The pulse train produced by transmitter 10 and radiated by antenna 20 is picked up in the receiver 12 by receiving antenna 24, which is an external device, protects and lends aesthetic value to the rest of the components of the receiver 12. The signal which is received on antenna 24 is fed to a radio demodulator 26 which may take various forms, one preferred form being hereinafter illustrated and described in detail. The demodulated signal is fed to a signal decode circuit 28 the function of which is to determine whether the correct sequence of 1's and 0's have been received in the pulse train. If the correct signal is received an output appears on line A which connects the signal decode circuit 28 to a digital processor 30 having a programmable read-only memory portion 32. The signal decode circuit 28 may be of any of the prior art digital types including that disclosed in the aforementioned Apple patent or the type disclosed in the aforementioned Wilmot patent.

Although the processor 30 has other functions hereinafter described, its principal function is to determine from the signal on output line A of the signal decode circuit 28 that a signal of the proper code and, from the presence or absence of a signal on decoder output line B, that the signal has been received in the normal door operating format and to initiate a door movement function by outputting a signal to the operator controller 36. The microprocessor 30 also responds to door operation signals from the wall-mounted pushbutton 38 which is hardwired into the receiver 12 by direct connection into the microprocessor 30.

Operator controller is connected to a standard 110 volt AC power supply by means of a vacation switch 40 which is toggle switch having a pull chain 42 or other suitable manually operable actuator. In fact, manual operation of the vacation switch 40 is not essential and numerous switches which are capable of the disconnect function but which are remotely or automatically operable are available.

Assuming the door 16 is in the closed position when a signal in the proper digit sequence and in the proper format is transmitted by transmitter 10 to receiver 12, microprocessor 30 is programmed to produce a signal to the operator controller 36 which causes the motor in the operator 14 to rotate in a direction which causes the door 16 to move on the track 18 to move toward the opened position. Depressing the pushbutton 38 produces the same function. Of course if the door 16 is in the opened position when the signal is received from the transmitter 10 or pushbutton 38, the output of the microprocessor 30 would be the same but the operator controller 36 selects proper direction of motor rotation to close the door 16. Obstacle detection functions may be associated with the operator controller 36 and the operator 14 in the conventional way.

The hand-held transmitter 10 is provided with a second pushbutton 44 adjacent the button 22 but having a non-textured surface, again, so that the buttons 44 and 22 can be tactily differentiated by the operator in a darkened environment. Depressing the button 44 produces radiation of the second pulse train shown in FIG. 4, said second pulse train being identical as far as bit values are concerned but varying in format in the sense that a much shorter blank time is present. In the second waveform the blank time is on the order of two pulse lengths. As before, continued depression of the button 44 causes the second waveform separated by the shortened blank times to repeat in alternating fashion.

Receipt of the digital code in the second format, i.e. a shortened blank time format, by the receiver 12 produces, in addition to the signal on line A indicating a proper code sequence, a second signal on line B indicating that the format has been altered. The altered format signal indicates that a first level disable function is desired. The program in memory 32 is arranged so that no output from the microprocessor 30 is delivered to the operator controller 36 upon receipt of both the A and B signals. Moreover, the microprocessor 30 will, once having received an input comprising the combination of both A and B signals, thereafter not respond to the proper code (A signal) until the combination of both A and B has again been received. This is essentially a toggle function which is programmed into the memory 32 as hereinafter described.

To review, the receipt of a "high" signal value on line A from the signal decode circuit 8 indicates that a proper bit sequence has been received in a long blank time format. Assuming the microprocessor 30 has not been previously disabled, the microprocessor 30 will produce an output to operator 36 to cause the door to move in one direction or the other. The receipt of a combined A plus B signal is recognized by the microprocessor 30 as a "disable" signal and no output to the operator 36 is produced. Moreover, the microprocessor 30 will thereafter be non-responsive to an A signal to produce any output. Only a second receipt of an A plus B signal will restore the microprocessor 30 to normal operating conditions. Of microprocessor 30 produces no response of any kind unless an A signal is produced. A truth table for the processor's response to the A and B signals is shown in FIG. 1.

By way of explanation, when the signals on lines A and B are both "0", no function results; when line A is "1" and line B is "0", normal door functions, such as opening and closing, can be accomplished (unless the operator is in the "secure" mode); when both A and B are "1", the "secure" mode is either set or reset.

Microprocessor 30 is shown in FIG. 1 to have a bidirectional signal transfer connection 48 to number of external accessory devices collectively indicated as 46. These devices may include, by way of example, toxic gas detectors, window and door position detectors, lights, horns, line carrier monitors and the like.

The microprocessor 30 as hereinafter described is provided with a number of inputs for receiving signals from external accessory devices and is provided with a program in ROM 32 which effectively inputs and evaluates the external accessory signals in some predetermined sequence. Moreover, the microprocessor 30 is provided with a number of outputs which, by way of communication lines 48, can send status signals or function commands to external accessories as desired. In a fully developed system, the accessory devices 46 are present; however, it is anticipated that the device of the present invention maybe sold and installed, at least initially, without such devices.

To prevent the microprocessor 30 from producing an inaccurate signal during the time between initial installation and some indefinite future date upon which accessory devices 46 are installed, all of the input terminals of the microprocessor 30 which are used to look for accessory input signals are connected to a false ground or "safe" ground 50. Microprocessor 30 may, therefore, run through the entirety of its external accessory program without producing any result or effect on the operator controller 36 or the operator 14 until such time as the accessory devices are actually installed.

By way of example, it may be desirable to connect a toxic gas detector mounted in the garage to the microprocessor 30 such that the absence of a dangerous toxic gas concentration produces a signal corresponding to that which is produced by the safe ground 50. In the presence of a high concentration of toxic gases such as carbon monoxide, however, the toxic gas detector produces a high signal to the input of the microprocessor 30. The microprocessor 30 is constantly running through a sequential program and, upon reading a "high" signal from the toxic gas detector on the toxic gas detector input terminal which is associated and identified in the program, the microprocessor 30 produces an output signal to the operator controller 36 which causes the door 16 through the operator 14 to be driven to the open position irrespective of the status of the transmitter 10, the signal decode circuit 28 and the pushbutton 38. By means of a safe ground 50, all of the operating characteristics associated with a toxic gas detector accessory may be maintained including the programming of the ROM 32 but without producing any possibility of spurious operation of the operator 14. Moreover, addition of a toxic gas detector as an accessory device requires no internal manipulations, such as circuit board replacement, on the part of the operator owner; he needs simply connect the toxic gas detector to the appropriate external and available terminal on the operator housing. This is but one example, others including examples of output signals will be apparent to those skilled in the art.

Figure 2:
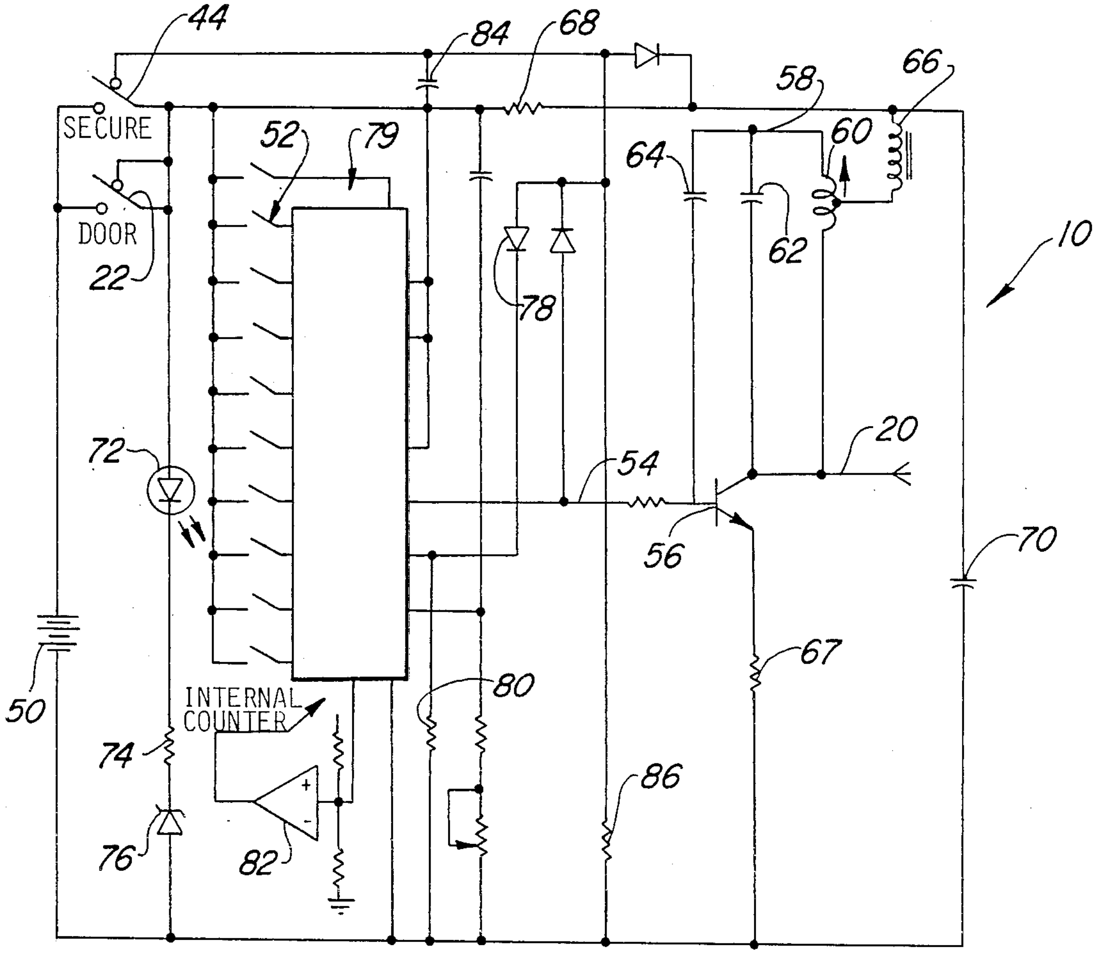
FIG. 2 is a schematic circuit diagram of a radio remote transmitter usable in the system of the present invention.

Referring now to FIG. 2, the schematic circuit diagram of the transmitter 10 is shown to comprise a 9-volt battery 50 connected through the normal door switch 22 to one side of each of a bank of ten code setting switches 52 arranged as a unit within the transmitter housing. In the preferred form, each of the switches has a rocker arm acuator which, although quite small, can be manually set by the owner to establish his own individual code. This code must of course also be set to the same digit arrangement within the receiver 12. When actuated by depression of the door switch 22, the bank of ten switches 52 provides an output on line 54 to an oscillator transistor 56 having a tank circuit 58 consisting of an inductor 60 and capacitor 62 and 64. The center tap of inductor 60 is connected to an inductor 66 which is tunable to establish the fundamental frequency of the oscillator transister 56. The collector electrode of transistor 56 is connected to the radiating antenna 20 as shown. The emitter electrode of transistor 56 is connected to ground through resistor 67. The top of inductor 66 is connected through a resistor 68 to the positive potential terminal of switch 22. A capacitor 70 is connected between the inductor 66 and ground.

When the switch 22 is closed, the battery voltage is applied across the series combination of a light-emitting diode 72, a resistor 74 and a Zener diode 76, the latter acting as a voltage regulator such that light-emitting diode 72 is not actuated whenever the voltage of battery 50 falls below some predetermined amount. In this fashion, light-emitting diode 72 operates as a battery condition indicator and appears, as shown in FIG. 1, on the face of the transmitter 10.

The transmitter 10 further comprises a "secure" switch 44 which is connected in parallel with switch 22 so that closure thereof operates the bank of ten switches 52 to produce the very same precoded pulse train as produced by depression of pushbutton 22. However, continued depression of button 44 results, at the first bit period of the blank time, the discharge of capacitor 84 through resistor 86 thereby to apply an error signal through diode 78 to pin 16 of the switch bank timing control circuit 79 which operates through an amplifier 82 to reset the internal counter as indicated by the legend in FIG. 2. This immediate reset does not occur when switch 22 is depressed and hence the internal counter of the switch bank timing control circuit 79 is permitted to run through all ten counts during the normal blank time.

In summary, the transmitter 10 produces the ten bit pulse train shown in FIG. 4 having a full ten digit blank time when the switch 22 is depressed. Transmitter 10 produces the ten bit pulse train shown in FIG. 4 to have a shortened blank time whenever switch 44 is depressed. Whenever switch 22 or 44 is released the internal counter to switch bank timing control circuit 79 is reset so that the code always starts with the first bit upon the next depression of either of the pushbuttons. The transmitter 10 does not know the condition of the receiver with respect to the security function; it is simply capable of emitting a pulse train in one or the other of two timing formats; either "normal" or "altered."

Figure 3A:
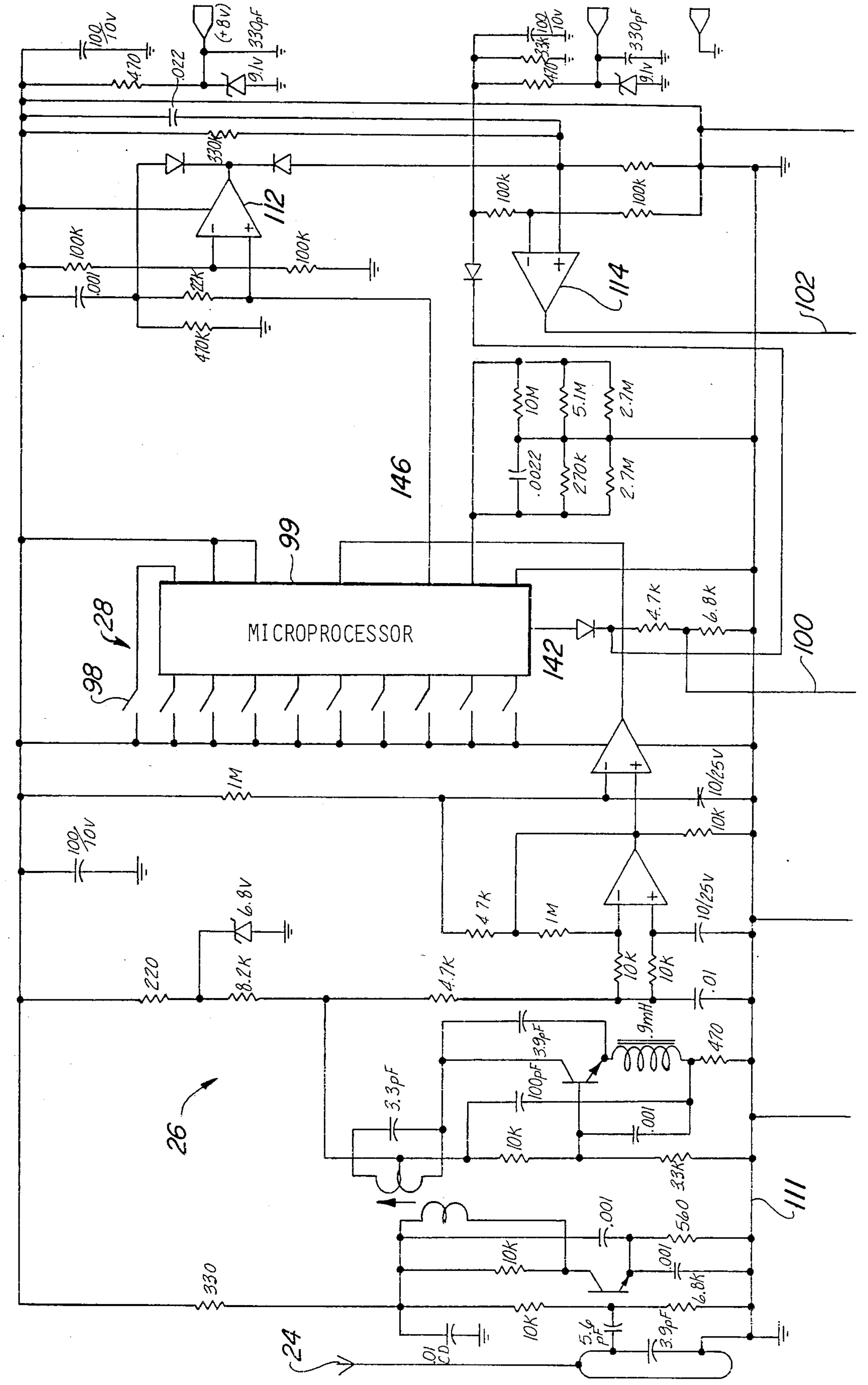
FIGS. 3*a* and B are a schematic circuit diagram of a receiver/decoder usable in the present invention.

Looking now to FIGS. 3A and B, receiver circuit 12 is shown to comprise the antenna 24 connected into the radio demodulator circuitry 26 which in turn is series of manually settable switches, 98 and a small microprocessor signal 99 having 18 terminals, the specfic form of the signal decode circuit being immaterial as far as the present invention is concerned so long as it is compatible with the digital pulse code. As previously mentioned, the decode circuit 28 may, for example take the form disclosed in the Umpleby et al U.S. Pat. No. 4,141,010. Reference numeral 100 is the "A" signal output line from FIG. 1 and references 102 designates the "B" signal line interconnecting the signal decode circuit 28 with the microprocessor 30. The microprocessor 30 is also shown in schematic form to include 18 terminals, the specific microprocessor (a COP 420) being available off the shelf from a number of suppliers. As shown in FIG. 1, the microprocessor 30 is understood to include a program memory 32 the contents and functions of which are hereinafter described.

Microprocessor 30 is connected to receive the "A" signal not only from the signal decode circuit 28 but also from the pushbutton 38, the "A" inputs being applied via line 100 to pin 7 of the microprocessor 30. The outputs 120, 122 and 124 of microprocessor 30 are the lamp, down actuation and up actuation signals and are shown connected to respective power transistors in the conventional operator controller circuitry 36. Power is supplied to the operator circuitry through the vacation switch 40 and a transformer and diode rectifier type power supply 104. Although the operator per se is not shown in FIG. 3, the lamp, down operation and up operation terminals are identified by reference characters 106, 108 and 110 respectively. Each of these terminals is activated by means of solenoid switches as parts of conventional operator controller circuitry 36 and will not be described in detail.

Figure 3B:
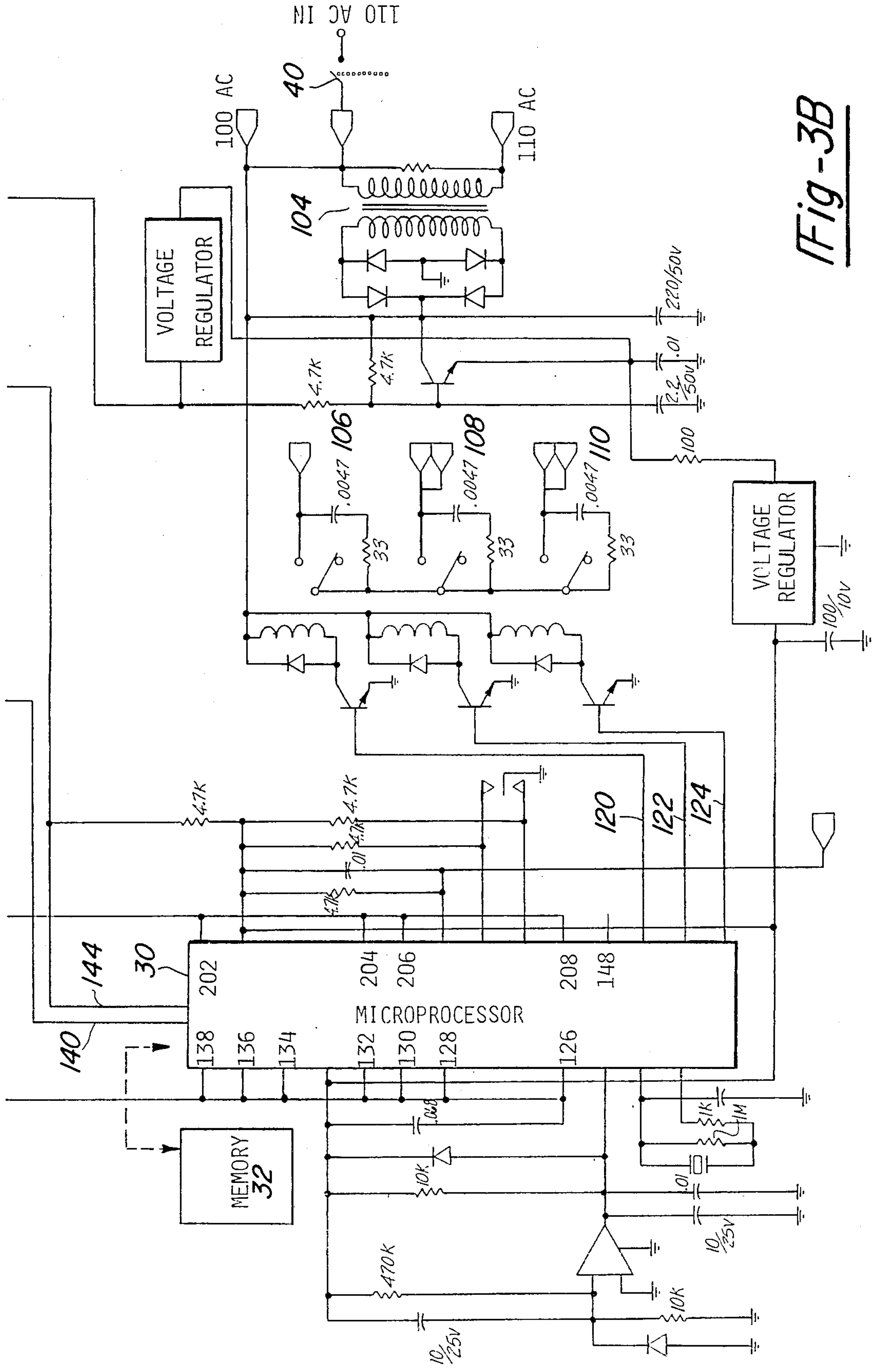

As shown in FIG. 3B, inputs 126, 128, 130, 132, 134, 136 and 138 of microprocessor 30 are all connected to a ground line 112 which produces a false "safe" to each of these inputs so that the memory of the microprocessor 30 may be programmed to perform routines which are applicable to a number of external accessory devices which, although not made a part of the device as sold, may be later connected in without the necessity for any additional programming activities or replacement of the ROM portion of the microprocessor 30. "A" input 140 of the microprocessor 30 is connected to line 100 to receive the "A" signal from the signal decode circuit (from "A" output 142) which signal represents the receipt and successful decoding of a correct 10 bit digital code; i.e., there is no format indication on line 100 as part of the "A" signal. The "B" signal is derived from the "B" output 146 of microprocessor 99 which is the "error" pin activated only if an error signal is detected; in this case the "B" output 146 of microprocessor 99 goes high when an error occurs or if a code pulse, i.e. the "secure" code, is received during the normal blank time. The "B" output 146 is connected to one input of an amplifier 112 which operates as a pulse shaper. The output of amplifier 112 is connected to an input of amplifier 114 which goes high whenever an error signal condition or the receipt of a reduced blank time format pulse train occurs. The output of amplifier 114 appears on line 102 and is the "B" signal applied to the "B" input 144 of the microprocessor 30.

The program stored in memory 32 is such as to cause microprocessor 30 to look first at the "A" input 140 which carries the "A" signal indicating the correct code has been received. Whenever a signal changes state from low to high on the "A" input 140, indicating that a correct code has been received, the program stored in memory 32 thereafter looks at the "B" input 144 of microprocessor 30 to determine whether that input is high, indicating that the "B" signal has been received. If no "B" signal appears, the single "A" signal represents normal door operation and the door operator control circuitry 36 is actuated accordingly by appropriate outputs on one or more of lamp output 120, down actuation output 122 and up actuation output 124. However, when the "B" signal goes high the combination of the two signals is processed and interpreted by the microprocessor 30 as a "secure door" signal and no output results; however, a toggle function is achieved within the microprocessor 30 so that the first combination of "A" plus "B" sets a flag thereby to render the microprocessor 30 non-responsive to later receptions of a valid "A" signal. The receipt of a second "A" plus "B" combination resets the flag and permits the microprocessor 30 to thereafter respond to a valid "A" signal.

Specific circuitry used in FIGS. 3A and B is standard state-of-the-art technology and a detailed description of each component is not deemed necessary to enable one skilled in the art to follow the circuit diagram. Specific component values are given as illustrative of a working embodiment.

Figure 5A:
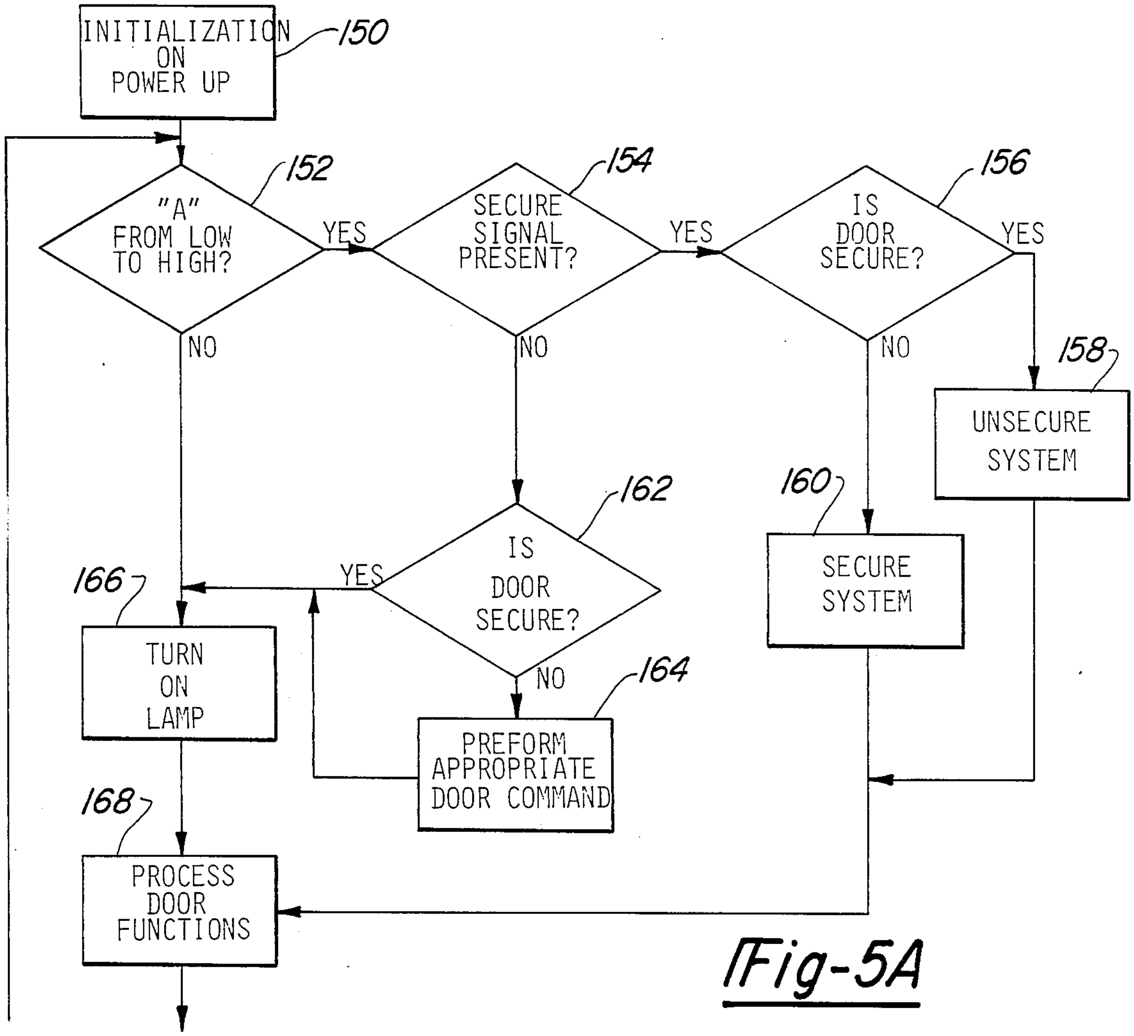
FIGS. 5A and B illustrate the operation of the receiver microprocessor.

FIGS. 5A and B illustrates the operation of microprocessor 30 in greater detail. At step 150, the microprocessor 30 is initialized whenever power is applied to the circuit. The initialization step includes resetting counters and timers and clearing portions of the random access memory contained within the microprocessor 30. At step 152, the microprocessor checks line 100 to determine whether the "A" line has transitioned from low to high. If not, a valid code has not been decoded by signal decode circuit 28 and control passes to step 166.

When the microprocessor 30 detects the "A" line going from low to high at step 152, the "B" line on line 102 is checked to see whether that line is high at step 154. If so, the microprocessor 30 then checks, at step 156, whether the door is secure. If the door is secure, receipt of a signal on line "B" causes the system to go to the unsecure state in step 158. Otherwise, if the door is unsecure, receipt of the signal on line "B" causes the system to be secured at step 160. Control then passes to step 168.

If, at step 152, the signal is received on the "A" line but no signal was received on the "B" line at step 154, the microprocessor 30 acts to move the door. First, microprocessor 30 checks whether the door is secure at step 162. If so, the door should not be moved and control passes to step 166. If the door is not secure, the appropriate door command is performed at step 164, either moving the door up or down depending on the direction in which the door was last moving. Control then passes to step 166.

At step 166, microprocessor 30 turns the lamp on via lamp output 120. At step 168, the standard door operation functions are processed. These functions are well-known in the art and include such things an obstacle detection, limit up or limit down protection, and excessive run time detection.

The microprocessor 30 then checks the additional devices which may be attached to the door operator. The following examples illustrate the types of devices which may be attached to the door operator but many other types of devices might also be attached in addition to or in place of any of the devices illustrated in FIG. 5.

At step 170, microprocessor 30 first checks whether a carbon monoxide detector is present by checking CO detector malfunction input 130. As indicated above, if CO detector malfunction input 130 is at ground level, the device is considered "safe." If no carbon monoxide detector is present, CO detector malfunction input 130 is tied to ground to generate a false "safe." If the device is present, it generates a ground input to CO detector malfunction input 130 when operating properly and a high input to CO detector malfunction input 130 when malfunctioning.

If the CO detector is present but has failed, an alarm is sounded at step 172 via alarm output 148. If the CO detector has not failed either because it is not present or because it is operating properly, the microprocessor 30 checks CO detector input 134 to determine whether carbon monoxide has been detected. If the CO detector is not present, CO detector input 134 will be tied to ground thus generating a false "safe" indicator. If the CO detector is present, it generates a ground level to CO detector input 134 if carbon monoxide is not detected and a high input to CO detector input 134 when carbon monoxide is detected.

If CO is present at step 174, the microprocessor 30 sounds an alarm via alarm output 148 and flashes a lamp at step 176 via lamp output 120 and automatically opens the door at step 178 via lamp output 124. If CO is not present, control passes to step 180.

At step 180, microprocessor 30 checks whether a heat detector is present or operating. If heat detector malfunction input 126 is low, the heat detector is either not present or is operating properly. If heat detector malfunction input 126 is high, heat detector is operating but has failed. In that case, an alarm is sounded at step 182. If the heat detector is not present or has not failed, microprocessor 30 checks heat detector input 128 to determine whether excessive heat is present at step 184. As for the CO detector, when signal level is low, no emergency is detected and control passes to step 188. If the logic level is high at heat detector input 128, excess heat is detected and an alarm is sounded, at step 186, via alarm output 148.

At step 188, the microprocessor 30 begins a check of the intrusion detection system. The microprocessor 30 first checks to see whether the system is in secure state. If not, intrusion detection is not performed. This prevents false alarms when residents are at home and have not armed the system. If the operator has been placed in the secure mode, the microprocessor 30 checks the intrusion detection circuit at step 190 by checking intrusion alarm input 132. As before, when intrusion alarm input 132 is low, it indicates that either the intrusion circuit is not present or that, if present, is operating properly. If the signal level is high, an intrusion is detected causing an alarm to sound and the lamp to flash at step 192 via alarm output 128 and lamp output 120, respectively. If the logic level at pin 10 is low, the microprocessor 30 checks the down limit switch. If the limit switch is open when the door is supposed to be closed, control passes to step 192 where the alarm is sounded and the lamp flashes. If the down limit is closed, the microprocessor 30 moves to step 196.

At step 196, the microprocessor 30 checks to see whether anything is changed since the last time through the loop. If so, a message is sent via, base station outputs 202, 204, 206 and 208 to a base station, which may be connected within the house, to indicate the event that has just taken place. If, at step 196, the status is not changed, the microprocessor 30, at step 200, checks whether it has been 168 seconds since the last message was sent. If so, the message is repeated at step 198. If not, or after sending a message, the processing cycle begins again at step 152.

We claim:

1. A door operator-controller system of the type comprising a door operable to be moved between open and closed positions, a motor, a motor controller adapted to be connected to a power supply and operatively associated with the motor for controlling the movements of said door, a radio receiver/decoder for triggering operation of said motor controller when a preselected code is received thereby, and a transmitter for radio communication with said receiver and having a door button which is actuable to produce normal operation of said system by sending said preselected code to said receiver, wherein the improvement comprises:

said transmitter transmitting said preselected code alternating with a blanking interval of approximately the same length of time as said preselected code in response to actuation of said door button, and further including a secure button and means for transmitting said preselected code alternating with a blanking interval or approximately two tenths the length of time as said preselected code in response to actuation of said secure button;

vacation switch means for selectively connecting and disconnecting said controller to and from its power supply; and a security means connected to said receiver/decoder for toggling between a secure mode and a non secure mode in response to receipt of said preselected code alternating with a blanking interval of approximately two tenths the length of time as said preselected code and for operating said door in response to receipt of said preselected code alternating with a blanking interval of approximately the same length of time as said preselected code only when in said non secure mode.

2. Apparatus as defined in claim 1 wherein said receiver/decoder include means for producing a first logic signal which varies according to receipt and non-receipt of said preselected code, and means for producing a second logic signal which varies according to the length of the blanking interval alternating with said preselected code.

3. Apparatus as defined in claim 2 wherein said security means further includes a microprocessor means connected to receive said first and second logic signals and being programmed to actuate said motor controller only if said preselected code is received with a blanking interval of approximately the same length of time as said preselected code.

4. Apparatus as defined in claim 3 wherein said microprocessor means further includes a plurality of accessory device inputs and outputs and is programmed to generate predetermined function commands at said outputs according to the logic levels of said inputs, whereby said apparatus may be connected to a plurality of condition sensing accessory devices for generating corresponding function commands in response to predetermined sensed conditions.

5. Apparatus as claimed in claim 4 wherein all of said accessory device inputs not connected to one of said accessory devices are connected to a false logic level signal source, and said microprocessor means is programmed to generate said predetermined function commands in response to a true logic level signal, whereby in the absence of one of said accessory devices said microprocessor fails to generate said corresponding function command.

6. Apparatus as defined in claim 1 wherein said door button has a distinctive tactile pattern and said secure button has a non-textured surface, whereby said door button and said secure button can be tactilely differentiated in a darkened environment.

* * * * *